US011086785B2

(12) United States Patent
Anchi et al.

(10) Patent No.: US 11,086,785 B2
(45) Date of Patent: Aug. 10, 2021

(54) HOST DEVICE WITH STORAGE CACHE AWARE PROCESSING OF INPUT-OUTPUT OPERATIONS IN MULTI-PATH LAYER

(71) Applicant: EMC IP Holding Company LLC, Hopkinton, MA (US)

(72) Inventors: Amit Pundalik Anchi, Bangalore (IN); Rimpesh Patel, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/580,526

(22) Filed: Sep. 24, 2019

(65) Prior Publication Data

US 2021/0089460 A1    Mar. 25, 2021

(51) Int. Cl.
   *G06F 12/0873* (2016.01)
(52) U.S. Cl.
   CPC .... *G06F 12/0873* (2013.01); *G06F 2212/608* (2013.01)
(58) Field of Classification Search
   CPC .. G06F 12/0873; G06F 3/0601; G06F 3/0604; G06F 3/061; G06F 3/0635; G06F 3/0611; G06F 3/0655; G06F 3/067; G06F 3/0683; G06F 2003/0697; G06F 2212/608
   See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,454,437 B1 | 11/2008 | Lavallee et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |

(Continued)

OTHER PUBLICATIONS

Goggin, E., Keron, A., Varoqui, C. and D. Olien "Linux Multipathing," in Proceedings of the Linux Symposium, vol. 1, pp. 147-167, 2005.*

(Continued)

*Primary Examiner* — Tracy A Warren
(74) *Attorney, Agent, or Firm* — Ryan, Mason & Lewis, LLP

(57) ABSTRACT

A host device is configured to communicate over a network with a storage system comprising a plurality of storage devices. The host device executes one or more processes that generate input-output (IO) operations for delivery to the storage system. The host device comprises a multi-path input-output (MPIO) driver configured to access for each of one or more of the storage devices a stored mapping between ranges of logical block addresses of the storage device and respective ones of a plurality of cache entities of the storage system, and for each of at least a subset of the IO operations, to identify a particular one of the cache entities based at least in part on a logical block address of the IO operation and the stored mapping, and to select a particular path for delivery of the IO operation to the storage system based at least in part on the identified cache entity.

20 Claims, 5 Drawing Sheets

(56) References Cited

U.S. PATENT DOCUMENTS

| | | | | |
|---|---|---|---|---|
| 8,972,657 | B1* | 3/2015 | Armangau | G06F 3/067 |
| | | | | 711/114 |
| 9,026,694 | B1 | 5/2015 | Davidson et al. | |
| 9,400,611 | B1 | 7/2016 | Raizen | |
| 9,594,780 | B1 | 3/2017 | Esposito et al. | |
| 9,733,846 | B1* | 8/2017 | Wigmore | G06F 11/1446 |
| 9,778,852 | B1 | 10/2017 | Marshak et al. | |
| 10,353,714 | B1 | 7/2019 | Gokam et al. | |
| 2004/0010563 | A1 | 1/2004 | Forte et al. | |
| 2008/0043973 | A1 | 2/2008 | Lai et al. | |
| 2009/0292834 | A1* | 11/2009 | Neemidge | G06F 3/0689 |
| | | | | 710/19 |
| 2010/0251267 | A1* | 9/2010 | Zwisler | G06F 12/0868 |
| | | | | 719/326 |
| 2011/0029730 | A1* | 2/2011 | Durocher | G06F 12/0866 |
| | | | | 711/114 |
| 2011/0197027 | A1 | 8/2011 | Balasubramanian et al. | |
| 2013/0290571 | A1* | 10/2013 | Rizzo | G06F 3/067 |
| | | | | 710/19 |
| 2015/0169233 | A1* | 6/2015 | Anderson | G06F 3/0629 |
| | | | | 711/173 |
| 2016/0092136 | A1 | 3/2016 | Balakrishnan et al. | |
| 2016/0092364 | A1* | 3/2016 | Feng | G06F 12/0873 |
| | | | | 711/119 |
| 2016/0117113 | A1 | 4/2016 | Li et al. | |
| 2016/0335003 | A1* | 11/2016 | Ahmed | G06F 3/061 |
| 2018/0189635 | A1 | 7/2018 | Olarig et al. | |
| 2019/0095299 | A1 | 3/2019 | Liu et al. | |
| 2019/0108888 | A1 | 4/2019 | Sarkar et al. | |

OTHER PUBLICATIONS

Ueda, K., Nomura, J. and M. Christie, "Request-based Device-mapper multipath and Dynamic load balancing," Proceedings of the Linux Symposium, vol. 2, pp. 235-243, 2007.*
B. Tulman, "In-Band and Out-of-Band Network Management," 2010, available: http://www.learncomputer.com/in-band-out-of-band-network-management/.*
Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMWare, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
U.S. Appl. No. 15/849,828 filed in the name of Sanjib Mallick et al. Dec. 21, 2017 and entitled "Storage System with Input-Output Performance Control Utilizing Application Process Detection."
U.S. Appl. No. 15/795,653 filed in the name of Maneesh Pusalkar et al. Oct. 27, 2017 and entitled "Storage System with Network-Wide Configurable Device Names."
U.S. Appl. No. 16/142,274 filed in the name of Sanjib Mallick et al. Sep. 26, 2018 and entitled "Host Device with Multi-Path Layer Implementing Automatic Standby Setting for Active-Active Configuration."
VMWare Knowledge Base, "8GB Emulex HBAs May Not React to RSCN Events Properly on Older Firmware Versions," https://kb.vmware.com/s/article/2005235, Sep. 20, 2013, 1 page.
Netapp Knowledge Base, "SAN Host Does Not Failover I/O to Alternate Paths When One or More Paths Are Removed and an RSCN Is Not Received," https://kb.netapp.com/app/answers/answer_view/a_id/1074454/~/san-host-does-not-failover-i%2Fo-to-alternate-paths-when-one-or-more-paths-are, Nov. 11, 2018, 3 pages.
Redhat, "Device-Mapper-Multipath on RHEL5 Experiences Excessive Delay in Detecting a Lost Path from a Storage Failure that Produces No RSCN or Loop/Link Error," https://access.redhat.com/solutions/23576, Mar. 21, 2014, 2 pages.
QLogic Corporation, "Release Notes," ftp://supermicro.com/driver/Broadcom/B57BCMCD_T7.12b.4.1/Windows_64/FCoE/release.txt, 2014, 10 pages.

* cited by examiner

HOST DEVICE WITH STORAGE CACHE AWARE PROCESSING OF INPUT-OUTPUT OPERATIONS IN MULTI-PATH LAYER

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operations for delivery to the storage system. For example, in the case of write requests, a given such write request is sent by a host device to the storage system, and an acknowledgement is received in the host device if the write request is successfully processed in the storage system. In these and other situations involving processing of IO requests received from a host device, a storage system may utilize one or more local caches in processing the received IO requests. For example, write requests of the type mentioned previously may be initially stored in one or more write caches of the storage system, and then acknowledged back to the host device, before being destaged to a destination storage device of the storage system. Performance of the storage system in these and other situations that involve processing IO requests received from a host device can be adversely impacted by cache-related issues of the storage system.

SUMMARY

Illustrative embodiments configure a multi-path layer of one or more host devices to include functionality for storage cache aware processing of IO operations in conjunction with communication with a storage array or other type of storage system via a storage area network (SAN) or other type of network. The multi-path layer illustratively comprises at least one multi-path input-output (MPIO) driver configured to process IO operations of at least one host device. In some embodiments, the MPIO driver implements storage cache aware processing in conjunction with path selection in order to provide improved load balancing while also facilitating failover policy execution.

In one embodiment, an apparatus comprises a host device configured to communicate over a network with a storage system comprising a plurality of storage devices. The host device is further configured to execute one or more processes that generate IO operations for delivery to the storage system. The host device comprises an MPIO driver configured to control delivery of the IO operations to the storage system over selected ones of a plurality of paths through the network. The MPIO driver is further configured to access for each of one or more of the storage devices a stored mapping between ranges of logical block addresses of the storage device and respective ones of a plurality of cache entities of the storage system, and for each of at least a subset of the IO operations, to identify a particular one of the cache entities based at least in part on a logical block address of the IO operation and the stored mapping, and to select a particular one of the paths for delivery of the IO operation to the storage system based at least in part on the identified cache entity.

The storage devices illustratively comprise respective logical storage volumes of the storage system.

In some embodiments, the cache entities of the storage system comprise respective components of the storage system that have respective local caches associated therewith. For example, the cache entities of the storage system can comprise respective storage controllers of the storage system with each such storage controller having a different local cache associated therewith. Numerous other arrangements of storage processors, directors or other cache entities can be used in other embodiments.

The mapping is illustratively generated at least in part by the MPIO driver and stored in one or more data structures of a kernel-space portion of an operating system of the host device, although many alternative generation and storage arrangements can be used.

In some embodiments, the mapping is generated at least in part using information obtained from the storage system and characterizing the cache entities of the storage system. Such information illustratively comprises information identifying components of the storage system that have respective local caches associated therewith, information about the local caches, and/or a chunk size associated with the local caches, the chunk size denoting a particular number of logical block addresses.

By way of example, the mapping is generated for a given one of the storage devices in some embodiments by determining a size of the storage device in terms of a total number of logical block addresses within that storage device, separating the total number of logical block addresses of the storage device into a plurality of ranges of logical block addresses, and assigning different ones of the ranges of logical block addresses to different ones of the cache entities of the storage system, with one or more of the cache entities each being assigned multiple distinct ones of the ranges of logical block addresses. The resulting assignments of ranges of logical block addresses to respective ones of the cache entities illustratively comprise the mapping that is stored in the host device. The total number of logical block addresses are illustratively separated into the plurality of ranges of logical block addresses using a designated chunk size, the chunk size denoting a particular number of logical block addresses.

In some embodiments, identifying a particular one of the cache entities based at least in part on a logical block address of the IO operation and the stored mapping comprises determining an initial logical block address and a transfer length for the IO operation, computing a target logical block address based at least in part on the initial logical block address and the transfer length, identifying a particular logical block address range that includes the target logical block address, and utilizing the stored mapping to identify the particular one of the cache entities corresponding to the particular logical block address range.

The target logical block address illustratively comprises an approximate midpoint logical block address between the initial logical block address and a final logical block address as indicated by the transfer length.

The MPIO driver may be further configured to maintain a plurality of path sets associated with respective ones of the cache entities of the storage system. In such an embodiment, selecting a particular one of the paths for delivery of the IO operation to the storage system based at least in part on the identified cache entity comprises identifying from a plurality of path sets at least one path set associated with the identified cache entity, and selecting the particular path from the identified path set.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
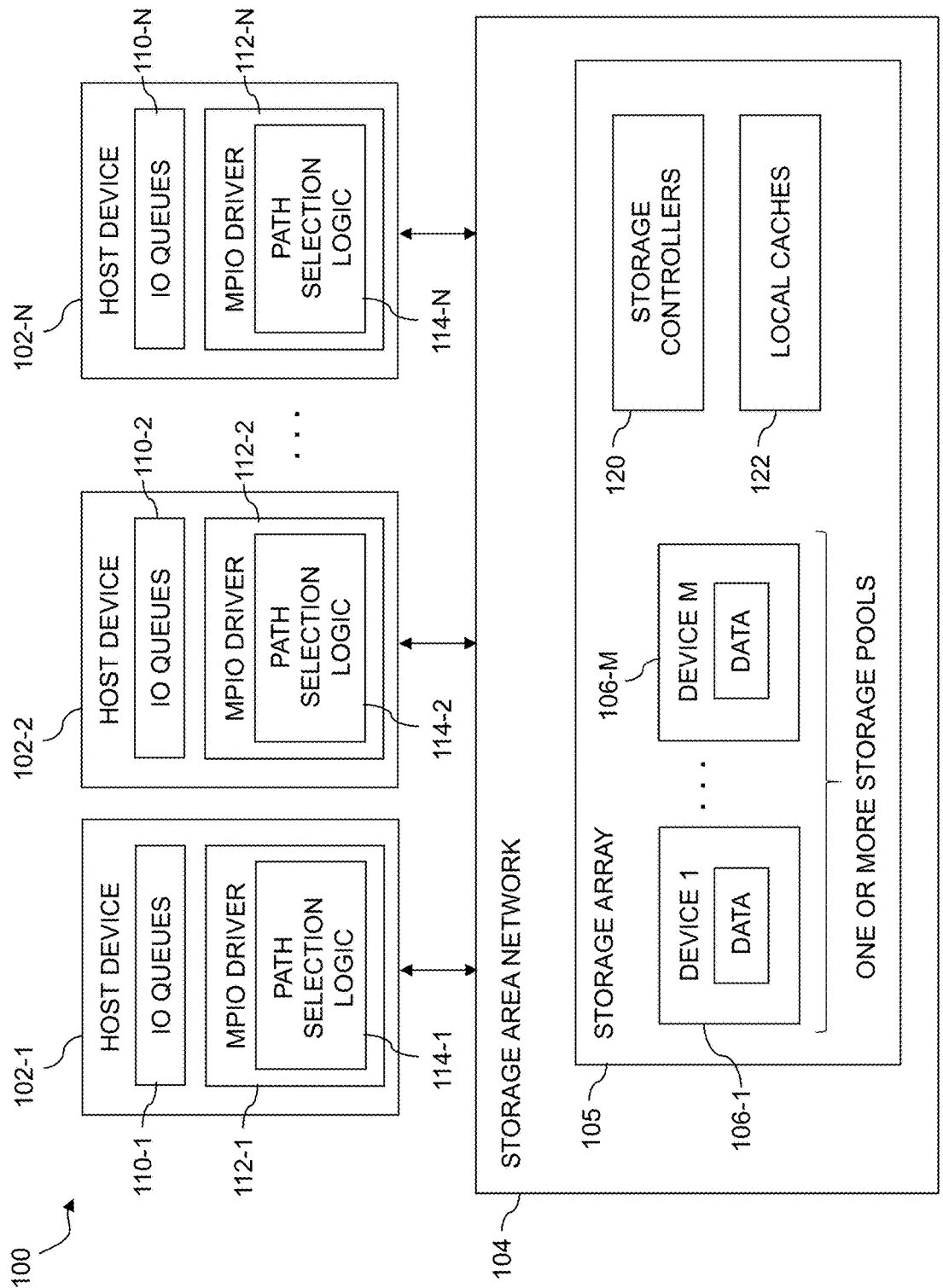
FIG. 1 is a block diagram of an information processing system configured with functionality for storage cache aware processing of IO operations utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for storage cache aware processing of IO operations using respective instances of path selection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for storage cache aware processing of IO operations. Other types of MPIO drivers from other driver vendors may be suitably modified to incorporate functionality for storage cache aware processing of IO operations as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to access for each of one or more of the storage devices 106 a stored mapping between ranges of logical block addresses (LBAs) of the storage device and respective ones of a plurality of cache entities of the storage array 105. In some embodiments, each of the storage devices 106 has a corresponding distinct stored mapping of this type accessible to the MPIO driver 112-1.

For each of at least a subset of the IO operations, the MPIO driver 112-1 determines the particular storage device to which the IO operation is directed, and accesses the stored mapping for that storage device, also referred to as the "target storage device" of the IO operation. The MPIO driver 112-1 identifies a particular one of the cache entities, based at least in part on an LBA of the IO operation and the stored mapping, and selects a particular one of the paths for delivery of the IO operation to the storage array 105 based at least in part on the identified cache entity. Accordingly, the storage cache aware processing functionality of the MPIO driver 112-1 selects an appropriate path for delivery of the IO operation to the storage array 105, based at least in part on a particular cache entity identified using an LBA of the IO operation and the stored mapping of the target storage device, and the IO operation is then delivered to the storage array 105 over the SAN 104 via the selected path.

Additional examples of storage cache aware processing of IO operations are described below in conjunction with the embodiments of FIGS. 2 through 5.

In the FIG. 1 embodiment, the storage array 105 comprises a plurality of storage controllers 120 and a plurality of local caches 122. For example, in some embodiments, each of the storage controllers 120 has a different one of the local caches 122 associated therewith, although numerous alternative arrangements are possible. The storage controllers 120 are examples of what are more generally referred to herein as "cache entities" of the storage array 105. A given "cache entity" of a storage system as the term is broadly used herein is intended to encompass a storage controller, storage processor or other system component that has a local cache or other type of cache allocated thereto or otherwise associated therewith. The caches illustratively include local caches 122, although other types of caches can be used in other embodiments. These are considered examples of "storage caches" as they are implemented in the storage array 105 or other type of storage system, rather than in host devices 102. The term "storage cache" as broadly used herein therefore refers to a cache implemented in a storage system.

Accordingly, in some embodiments, the cache entities of the storage array 105 comprise respective storage controllers 120 of the storage array 105 that have respective local caches 122 associated therewith.

The above-noted stored mapping of LBA ranges to respective ones of the cache entities of the storage array, such as respective ones of the storage controllers 120, is illustratively generated at least in part by the MPIO driver 112-1 and stored in one or more data structures of a kernel-space portion of an operating system of the host device 102-1. Alternatively, other components of the host device 102-1 can be involved in at least one of the generating and the storage of the mapping for a given one of the storage devices 106, using other types of data structures or storage arrangements.

In some embodiments, a given such mapping is generated at least in part using information obtained from the storage array 105 and characterizing the cache entities of the storage array 105, such as the storage controllers 120.

For example, the information characterizing the cache entities of the storage array 105 for use in generating the mapping illustratively comprises information identifying the storage controllers 120 of the storage array 105 that have respective local caches 122 associated therewith, information about the local caches 122, and a chunk size associated with the local caches 122, where the chunk size denotes a particular number of LBAs.

The information characterizing the cache entities of the storage array 105 for use in generating the mapping can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, the information characterizing the cache entities of the storage array 105 for use in generating the mapping can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection.

In some embodiments, the mapping is generated for a given one of the storage devices 106 using the following steps:

1. Determining a size of the storage device in terms of a total number of LBAs within that storage device.
2. Separating the total number of LBAs of the storage device into a plurality of ranges of LBAs.
3. Assigning different ones of the ranges of LBAs to different ones of the cache entities of the storage array 105.

As noted above, the cache entities of the storage array 105 comprise respective ones of the storage controllers 120. One or more of the cache entities are each assigned multiple distinct ones of the ranges of LBAs, utilizing the steps of the process described above. The resulting assignments of ranges of LBAs to respective ones of the cache entities comprise the mapping which is stored in the host device 102-1 so as to be accessible to the MPIO driver 112-1 in providing storage cache aware processing of IO operations as disclosed herein.

In some embodiments, separating the total number of LBAs of the storage device into a plurality of ranges of LBAs in Step 2 above comprises separating the total number of LBAs into the plurality of ranges of LBAs using a designated chunk size, with the chunk size denoting a particular number of LBAs.

A particular one of the cache entities is identified based at least in part on an LBA of the IO operation and the stored mapping using the following steps:

1. Determining an initial LBA and a transfer length for the IO operation.
2. Computing a target LBA based at least in part on the initial LBA and the transfer length.
3. Identifying a particular LBA range that includes the target LBA.
4. Utilizing the stored mapping to identify the particular one of the cache entities corresponding to the particular LBA range.

The target LBA referred to in Steps 2 and 3 above is different than the initial LBA, and illustratively comprises an approximate midpoint LBA between the initial LBA and a final LBA as indicated by the transfer length. Other types of target LBAs can be used in identifying LBA ranges and corresponding cache entities.

In some embodiments, the MPIO driver 112-1 is further configured to maintain multiple path sets associated with respective ones of the cache entities of the storage array 105. In embodiments of this type, selecting a particular one of the paths for delivery of the IO operation to the storage array 105 in the path selection logic 114-1 based at least in part on the identified cache entity more particularly comprises identifying from the path sets at least one path set associated with the identified cache entity, and selecting the particular path from the identified path set.

These and other functions related to storage cache aware processing of IO operations that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to access "stored mappings" are intended to be broadly construed, and should not be viewed as being limited to any particular storage arrangement, such as storage in a particular host device component or using a particular format. Accordingly, such storage can be in a memory or other storage device that is outside of the MPIO driver.

Various conditions can lead to generation of new stored mappings, updating of existing stored mappings and/or deletion of existing stored mappings in illustrative embodiments. For example, the addition of a new storage device to the set of storage devices 106 can trigger the creation of a new stored mapping for that storage device. Similarly, the deletion of an existing storage device from the set of storage devices 106 can trigger the removal of an existing stored mapping for that storage device from the system.

It is to be appreciated that the term "stored mapping" as used herein is intended to be broadly construed, as so to encompass a wide variety of different types of stored information and associated storage arrangements for relating LBA ranges to cache entities of a storage array or other storage system.

As indicated previously, absent use of the techniques for storage cache aware processing of IO operations in a multi-path layer as disclosed herein, performance of the storage system in processing IO requests received from a host device can be adversely impacted by cache-related issues of the storage system. For example, a host-based load balancing algorithm that is unaware of the particular cache entity configuration of a storage system can inadvertently cause an increased number of cache misses, thereby increasing the processing overhead of the storage system and degrading its performance.

As an illustration of a problematic situation of the type described above, consider a simple example of a storage array having two controllers C1 and C2 with respective local caches CA1 and CA2. The two controllers C1 and C2 have respective ports P1 and P2. Assume that a write IO having an LBA offset of 100 is delivered from the multi-path layer of a host device to the storage array via port P1 of controller C1 and is therefore written to the local cache CA1 of controller C1. Further assume that the next write IO has the same LBA offset of 100. However, due to load balancing performed in conjunction with path selection by the multi-path layer of the host device, that write IO is delivered to the storage array via port P2 of controller C2 and is therefore written to the local cache CA2 of controller C2. The load balancing has therefore turned what might have been a cache hit in local cache CA1 into a cache miss in the local cache CA2. In addition, the previously-written data at LBA offset 100 in local cache CA1 will have to be marked as "dirty" and subsequently updated. Read IOs can cause similar adverse performance impacts within the storage array.

Such drawbacks are advantageously overcome in illustrative embodiments herein by utilization of a multi-path layer comprising one or more of the MPIO drivers 112 to provide storage cache aware processing of IO operations as described above. These embodiments therefore provide a significant advance over conventional techniques that do not take storage cache arrangements of the storage system into account in path selection. For example, storage cache aware arrangements of the type disclosed herein can substantially reduce cache misses by better matching a load balancing algorithm or other type of path selection algorithm of a multi-path layer of a host device to the cache entity configuration of the storage system, leading to improved overall performance.

The above-described functions associated with storage cache aware processing of IO operations in the MPIO driver 112-1 are carried out at least in part under the control of its path selection logic 114-1. For example, the path selection logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for storage cache aware processing of IO operations.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support storage cache aware processing of IO operations.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

In some embodiments outside of the active-active context, a multi-path layer is illustratively configured to map LBA ranges only to available controllers, directors or other cache entities. For ALUA arrangements of this type, it is possible that one or more cache entities will not be mapped to any LBA range, and as a result there will typically be no IO operations sent using the corresponding path set, since doing so might otherwise result in a significant performance penalty. There and other references herein to mapping of ranges of LBAs to respective cache entities are therefore intended to be broadly construed, and should not be viewed as requiring that all cache entities of the storage system necessarily must have at least one LBA range mapped thereto.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
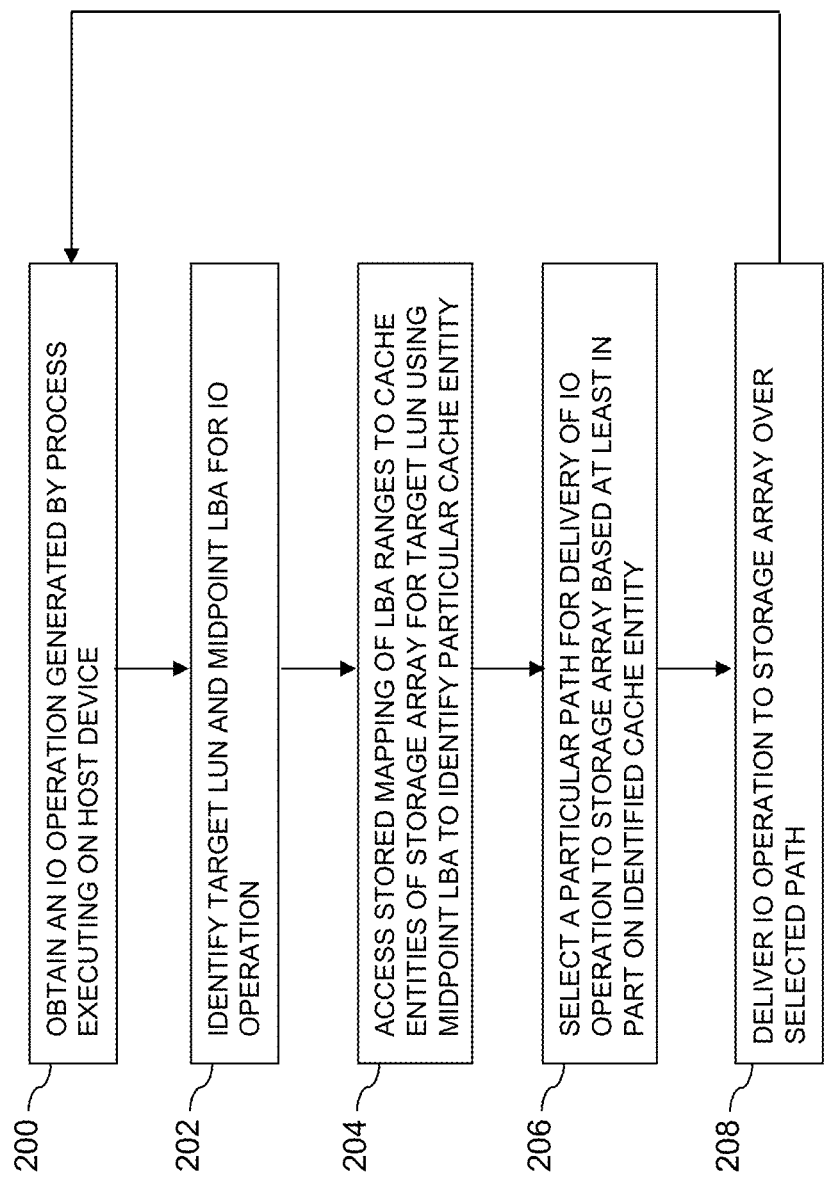
FIG. 2 is a flow diagram of a process for storage cache aware processing of IO operations utilizing a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 of the MPIO driver 112-1 of host device 102-1. Other arrangements of host device components and/or other system components can be configured to perform at least portions of one or more of the steps in other embodiments.

In step 200, an IO operation generated by a process executing on a host device is obtained. For example, the IO operation may be obtained by retrieving it from one of a plurality of IO queues of the host device. It is assumed that the IO operation is generated by a process of an application running on the host device, and is queued with other operations generated by other processes of that application and possibly other processes of other applications for storage cache aware processing as disclosed herein.

In step 202, a particular LUN to which the IO operation is directed is identified. This LUN is referred to as the target LUN of the IO operation. Also, a midpoint LBA for the IO operation is identified in the manner described elsewhere herein.

In step 204, a stored mapping of LBA ranges to cache entities of the storage array for the target LUN is accessed using the midpoint LBA to identify a particular cache entity of the storage array. It is assumed in this embodiment that different LUNs of the storage array have respective different stored mappings of LBA ranges to cache entities of the storage array.

In step 206, a particular path is selected for delivery of the IO operation to the storage array, based at least in part on the particular cache entity identified from the stored mapping of LBA ranges in step 204.

In step 208, the IO operation is delivered to the storage array over the particular path selected in step 206. The FIG. 2 process then returns to step 200 as indicated in order to obtain another IO operation for further processing through steps 202 through 208 in the manner previously described.

Multiple additional instances of the FIG. 2 process may be performed in respective additional host devices that share the storage array. Other embodiments can include multiple storage arrays, with the disclosed functionality for storage cache aware processing of IO operations being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for storage cache aware processing of IO operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different storage cache aware processing arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
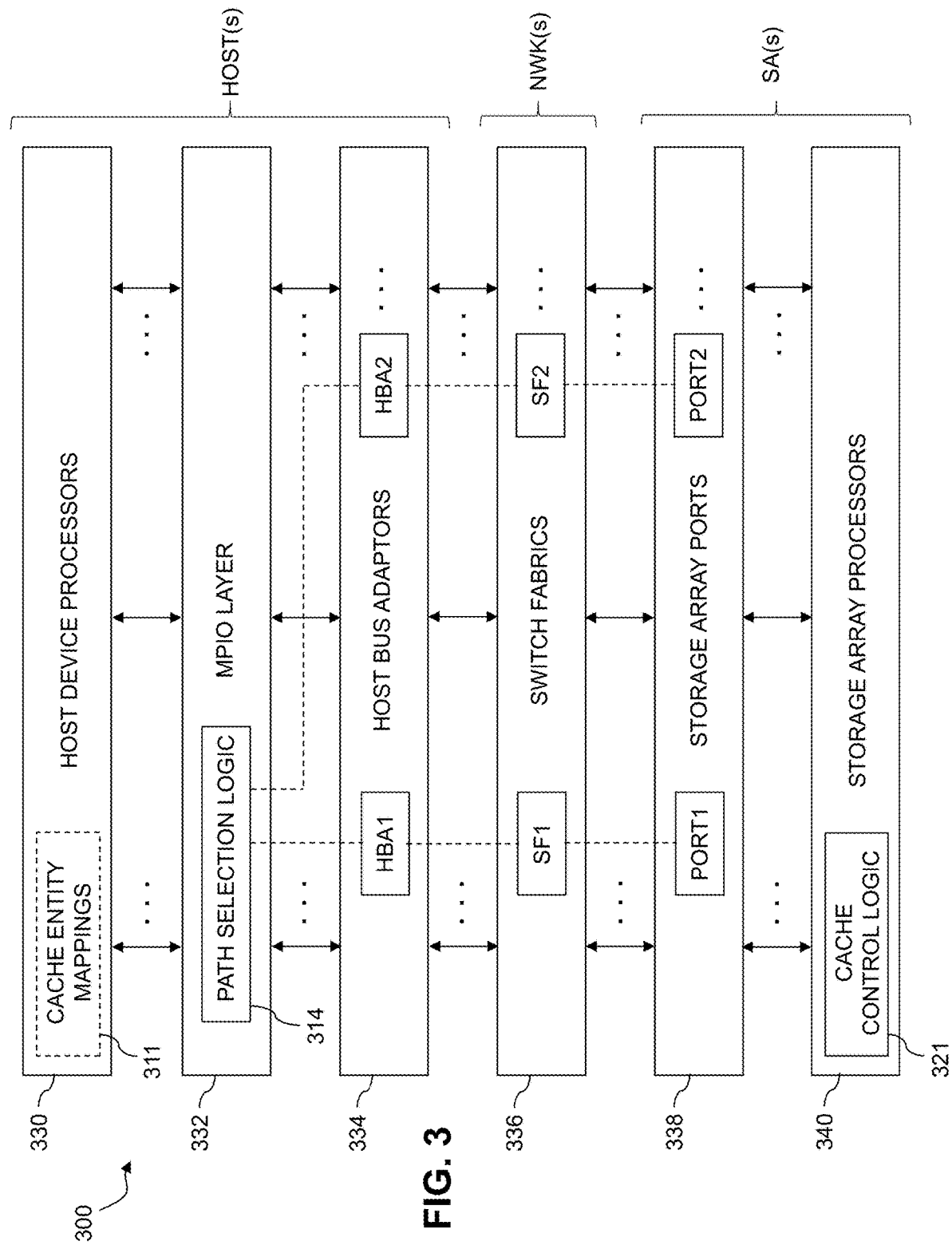
FIG. 3 is a block diagram showing multiple layers of a layered system architecture that includes a multi-path layer with functionality for storage cache aware processing of IO operations in an illustrative embodiment.

Referring now to FIG. 3, another illustrative embodiment is shown. In this embodiment, an information processing system 300 comprises one or more instances of each of cache entity mappings 311, path selection logic 314 and cache control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements storage cache aware processing of IO operations using stored cache entity mappings 311. The cache entity mappings 311 are illustratively shown as part of one or more host device processors of the host device processor layer 330. Again, a wide variety of other cache entity mapping storage arrangements are possible, and the cache entity mappings 311 are therefore shown in dashed outline in the figure. For example, the cache entity mappings 311 in other embodiments are illustratively stored entirely in the MPIO layer 332. It is therefore possible in some embodiments that the cache entity mappings 311 can be stored utilizing a component of the MPIO layer 332, such as within a data structure of the path selection logic 314. The cache entity mappings 311 are examples of what are more generally referred to herein as "stored mappings" used in providing storage cache aware processing of IO operations.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for storage cache aware processing of IO operations substantially as previously described. Additional or alternative layers and path selection logic arrangements can be used in other embodiments.

The cache control logic 321 implemented in the storage array processor layer 340 controls the configuration and operation of caches associated with respective cache entities of the system 300, such as multiple local caches associated with respective ones of a plurality of storage controllers of the system 300. For example, the cache control logic 321 can include functionality for allocating available cache resources among a plurality of cache entities of a given storage array of the system 300. It is also possible in some embodiments that the cache control logic 321 can include multiple distinct cache control logic instances for multiple sets of cache entities of respective ones of a plurality of storage arrays of the system 300.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

It is assumed in this embodiment that the host devices through their respective MPIO drivers and respective instances of cache entity mappings 311 provide functionality for storage cache aware processing of IO operations, possibly with involvement of other host device components. Accordingly, the path selection logic 314 utilizes information from the cache entity mappings 311 in determining appropriate paths over which to send particular IO operations to ports of one or more storage arrays. As described elsewhere herein, such storage cache aware processing of IO operations can substantially reduce cache misses and lead to significantly improved system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described with reference to FIGS. 4 and 5. It is assumed in these embodiments that the MPIO driver of a given host device provides the disclosed storage cache aware processing functionality, under the control of a corresponding instance of path selection logic implemented in the MPIO driver, possibly with involvement of one or more other host device components.

Figure 4:
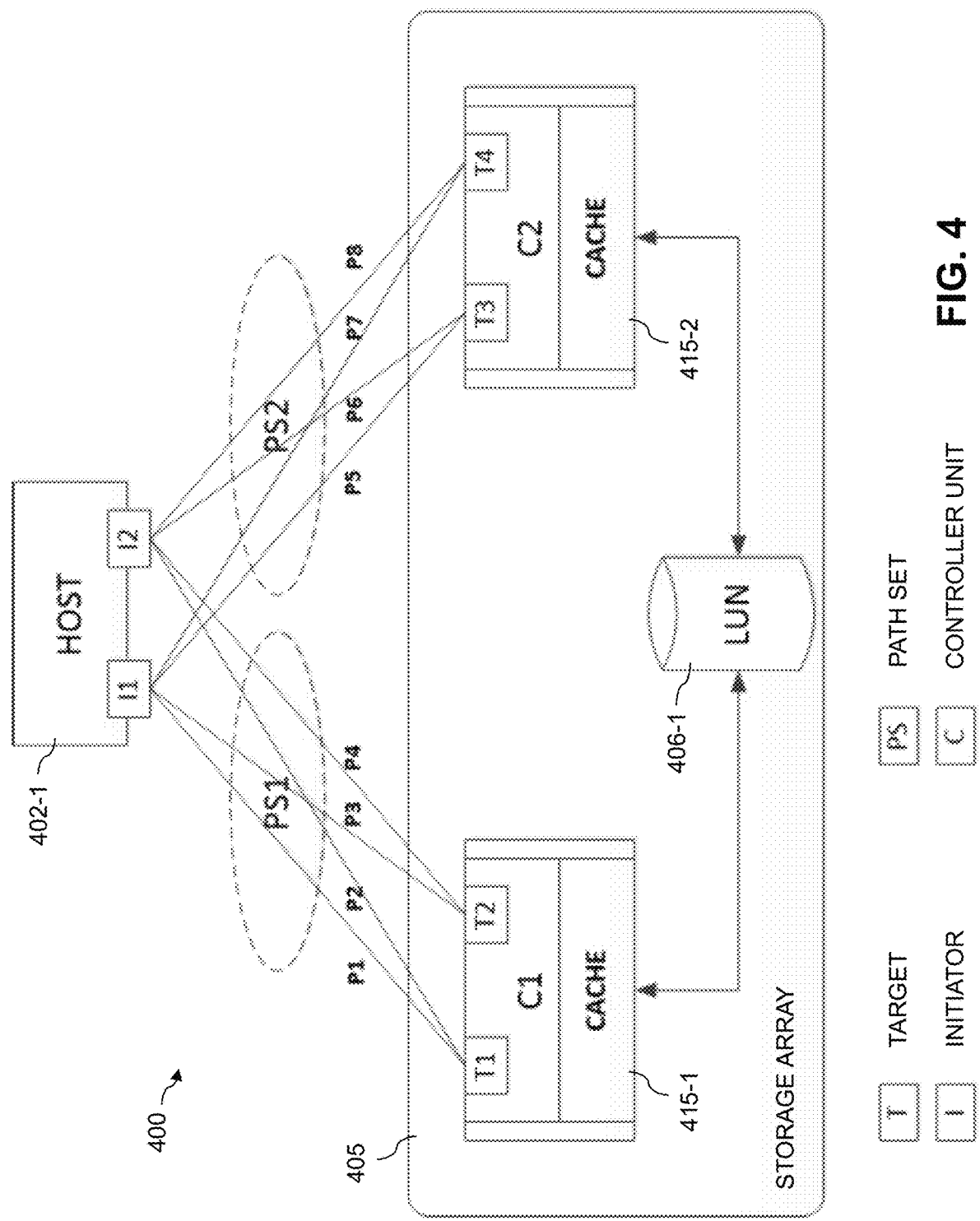
FIGS. 4 and 5 show an example of storage cache aware processing of IO operations utilizing a multi-path layer of a host device in another illustrative embodiment.

With reference now to FIG. 4, an information processing system 400 comprises a host device 402-1 coupled to a storage array 405. The host device 402-1 comprises initiators I1 and I2 that communicate with targets T1, T2, T3 and T4 over a plurality of paths as shown. The paths are associated with respective initiator-target pairs. For example, a path P1 is associated with the initiator-target pair I1-T1, a path P2 is associated with the initiator-target pair I2-T1, and so on for the other paths. The initiators I1 and I2 illustratively comprise respective HBAs of the host device 402-1, and the targets T1 through T4 illustratively comprise respective ports of the storage array 405. The paths in this embodiment are arranged in first and second path sets denoted as path set PS1 and path set PS2. Path set PS1 comprises paths P1, P2, P3 and P4, which path set PS2 comprises paths P5, P6, P7 and P8. It is assumed that the host device 402-1 comprises an MPIO driver of the type described elsewhere herein, suitably configured to provide storage cache aware control of delivery of IO operations to the storage array 405 over selected ones of the paths of the path sets PS1 and PS2.

The storage array 405 comprises at least one LUN 406-1 and first and second controller units C1 and C2 associated with respective first and second caches 415-1 and 415-2. The LUN 406-1 is accessible via the controller units C1 and C2 utilizing their respective caches 415-1 and 415-2. The first controller unit C1 includes the targets T1 and T2, and illustratively comprises a first storage controller having first cache 415-1 as its local cache. Similarly, the second controller unit C2 includes the targets T3 and T4, and illustratively comprises a second storage controller having second cache 415-2 as its local cache. The controller units C1 and C2 are examples of what are more generally referred to herein as respective "cache entities" of the storage array 405, and may in some cases include their respective caches 415-1 and 415-2. Alternatively, the caches 415-1 and 415-2 are arranged outside of the controller units C1 and C2, as in the particular arrangement illustrated in the figure. Also, other types of cache entities can be used in other embodiments. For example, alternative cache entities in some embodiments can include lower level components that are part of a storage hierarchy of the storage array 405 and have local caches associated therewith.

As indicated above, the LUN 406-1 of storage array 405 is accessible from host device 402-1 via eight paths P1 through P8, with each of the controller units C1 and C2 handling IO operations arriving on the four paths of the respective path sets PS1 and PS2.

It is to be appreciated that different numbers, types and arrangements of hosts, storage arrays, controller units, caches, initiators, targets, path sets and LUNs can be used in other embodiments.

In the FIG. 4 embodiment, the host device 402-1 is assumed to store a mapping between ranges of LBAs of the LUN 406-1 and respective cache entities comprising the first and second controller units C1 and C2.

Figure 5:
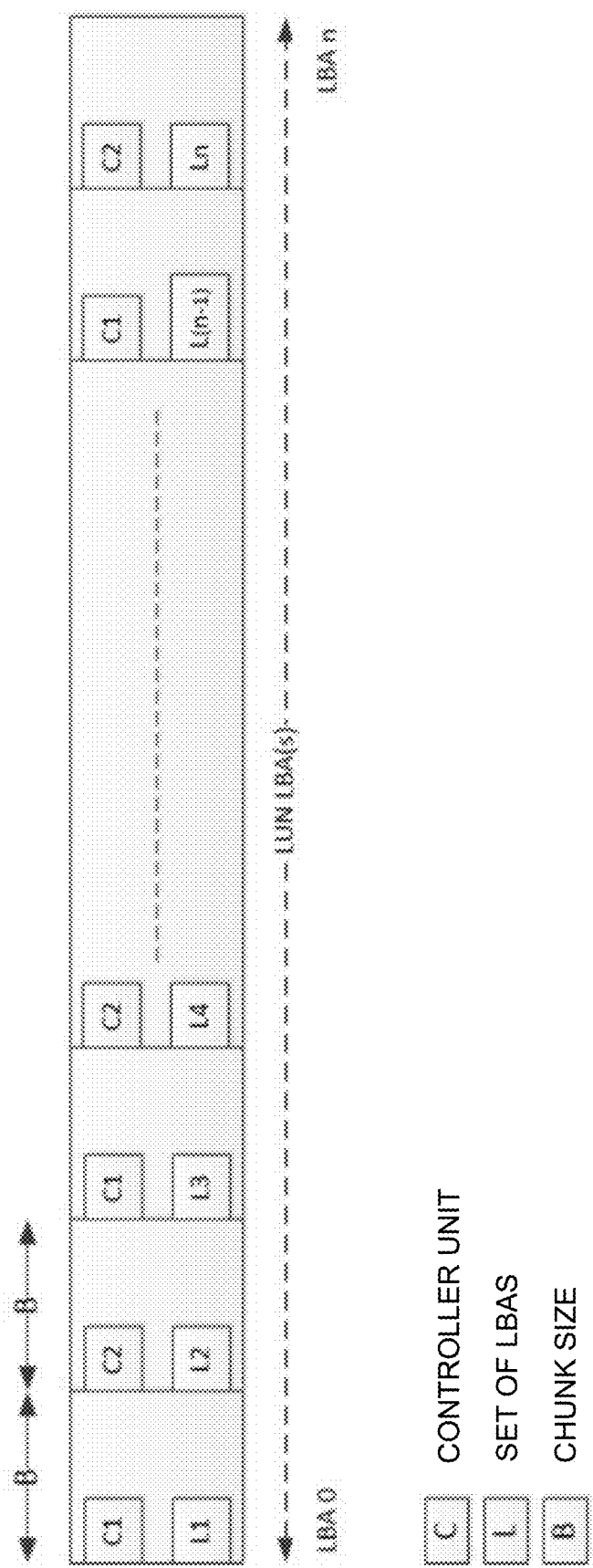

For example, with reference to FIG. 5, the LUN 406-1 illustratively comprises a plurality of LBAs denoted as LBA 0 through LBA n. The total number of LBAs for a given LUN can be determined using a "read capacity" command or other similar command of a given storage protocol. The stored mapping is generated using a specified chunk size B that illustratively denotes a particular number of LBAs. In the FIG. 5 example, the stored mapping associates different ranges of LBAs of LUN 406-1 with different ones of the first and second controller units C1 and C2. Each of the LBA ranges, also referred to in this example as respective sets of LBAs, has the designated chunk size B.

Accordingly, the LBAs of the LUN 406-1 are divided into separate ranges each of chunk size B, although it is possible in other embodiments that, depending on the particular size of the LUN, it may not be evenly divisible by the chunk size B, in which case a final one of the ranges may have a different size than the others. Also, although an even division of the LBAs into LBA ranges having chunk size B is used in the FIG. 5 example, other techniques may be used to separate the LBAs of a LUN into LBA ranges in other embodiments.

The different LBA ranges are assigned to the controller units C1 and C2 in the manner illustrated in FIG. 5. For example, LBA range L1 is assigned to C1, LBA range L2 is assigned to C2, LBA range L3 is assigned to C1, LBA range L4 is assigned to C2, . . . LBA range n-1 is assigned to C1, and LBA range Ln is assigned to C2. The resulting assignments when stored in the host device 402-1 provide an example of what is more generally referred to herein as a "stored mapping" between ranges of LBAs and respective ones of a plurality of cache entities of the storage array 405.

An example default chunk size B suitable for use in some embodiments is 4096 LBAs, although other chunk sizes can be used. The LBA ranges in the FIG. 5 example are mapped to the cache entities in an alphanumeric sorted order of the cache entities, and so beginning with the first controller unit C1 and then alternating between C1 and C2 until all LBA ranges are mapped to a controller unit. Multiple ones of the LBA ranges are therefore mapped to the same controller unit in this embodiment.

The process of mapping the LBA ranges to the controller units C1 and C2 is illustratively performed in the MPIO driver of the host device 402-1. The chunk size can be globally configured to a particular default value that is determined to work well across multiple different storage arrays of different types. The chunk size can instead be set individually to different values for different storage arrays of different types.

Additionally or alternatively, different chunk sizes can be used for different LUNs within a given storage array. Thus, the stored mapping for one LUN of a storage array can be generated using a different chunk size than that used to generate the stored mapping for another LUN of the storage array. Other factors can be taken into account in determining an appropriate chunk size in a given embodiment, such as the type of application or applications utilizing the LUN and their typical IO workload sizes. Such adjustments in chunk size or other parameters relating to generation of a stored mapping as disclosed herein can be implemented, for example, utilizing a user input configuration file, or utilizing a command line interface (CLI) to configure software of the hos device.

It should be noted that a resizing operation or other similar operation that significantly alters the configuration of the LUN 406-1 will generate necessitate that the MPIO driver generate an updated mapping for that LUN. As indicated previously, different mappings are generally stored by a host device for different LUNs of a storage array in illustrative embodiments. Such updating of one or more of the stored mappings can be event driven based on a change notification or manually triggered through a CLI.

In operation, the MPIO driver of the host device 402-1 provides storage cache aware processing of IO operations using the stored mapping as described above. More particularly, for each of at least a subset of the IO operations, the MPIO driver identifies a particular one of the cache entities based at least in part on an LBA of the IO operation and the stored mapping, and selects a particular one of the paths for delivery of the IO to the storage array 405 based at least in part on the identified cache entity.

For a given IO operation, the MPIO driver generally has information such as the target LUN, possibly identified by its major and minor numbers, to which the IO operation is directed, as well as a starting LBA of the IO operation, a number of logical blocks to be transferred, also referred to as the transfer length, and the target LUN size, which specifies the total number of LBAs in the target LUN.

The MPIO driver is also configured to obtain information from the storage array 405 regarding its cache entity configuration, such as the identities of the cache controllers C1 and C2 having respective caches 415-1 and 415-2 associated therewith. Such information can be stored in a kernel-space data structure of the MPIO driver of the host device 402-1, or elsewhere in the host device 402-1. The cache entity configuration can include an identification of particular cache entities of the storage array 405 that have respective caches associated therewith. Although in the FIG. 4 embodiment, the cache entities are the controller units C1 and C2 having respective caches 415-1 and 415-2, in other embodiments other types of cache entities can be present, such as storage processors, directors, bricks or other components of a storage hierarchy of a given storage array or other storage system. The cache entity configuration also illustratively includes various characteristics of the caches associated with the respective cache entities, and may further include a particular chunk size designation. As mentioned elsewhere herein, the host device 402-1 can obtain such information from the storage array 405 using various in-band mechanisms such as particular standard or vendor unique commands of a storage protocol. Out-of-band mechanisms can additionally or alternatively be used. At least portions of the cache entity configuration information can be provided in advance by a storage array vendor and implemented directly in host software.

A more particular example of an algorithm implemented by an MPIO driver of the host device 402-1 to provide storage cache aware processing of IO operations using the stored mapping is as follows, for a given IO operation:

1. Determine the LBA offset and the transfer length of the IO operation.
 2. From the LBA offset and the transfer length, calculate a midpoint LBA for the IO operation.
 3. From the chunk size and the midpoint LBA, identify a particular LBA range having the chunk size that contains the midpoint LBA.
 4. From the identified LBA range, identify a particular controller unit using the stored mapping of LBA ranges to controller units.
 5. From the identified controller unit, identify a corresponding path set.
 6. Select a path for delivery of the IO operation to the storage array 405 from the identified path set.

As a more particular illustration of the above algorithm, consider an example in which an IO operation has an LBA offset of 5000 and a transfer length of 1000, resulting in a midpoint LBA that is given by $$5000 + \frac{1000}{2} = 5500.$$

Using a chunk size B of 4096, and with reference to FIG. 5, the identified LBA range is L2, which is associated with controller unit C2 in the stored mapping. Accordingly, the multi-path layer of host device 402-1 will utilize a path selected from the path set PS2, namely, a selected one of the paths P5, P6, P7 or P8, in delivering the IO operation to controller unit C2.

In these examples, a path set is selected for a given IO operation based on its midpoint LBA, thereby increasing the likelihood that subsequent related IO operations will result in cache hits in the local cache of the corresponding controller unit. It should be noted that different LBAs other than the midpoint LBA can be used in determining a path set via the stored mapping as described above. For example, an approximate midpoint LBA can be used, such as an LBA that is slightly above or below the midpoint LBA. Other types of LBAs other than a starting or ending LBA can similarly be used for this purpose.

Once a particular path set is determined for a given IO operation using the stored mapping which relates LBA ranges to respective controller units or other cache entities of the storage array, only the paths of that path set are considered for selection for delivery of that IO operation to the storage array in implementing load balancing or failover policy execution functionality of the multi-path layer. Within the path set, a particular path can be selected using a designated path selection algorithm, such as least recently used (LRU), most recently used (MRU), round robin, adaptive, or numerous others.

In some embodiments, if a given IO operation spans more than one LBA range having the designated chunk size, that IO operation may still be sent to the storage array using a path selected from the particular path set determined using the midpoint LBA, but possibly with additional information that indicates to the storage array that the corresponding cache should be bypassed for the given IO operation. By way of example, information such as a Force Unit Access (FUA) bit and a Disable Page Out (DPO) bit may be set in a SCSI command representing the IO operation. Similar arrangements in other storage protocols can be used to avoid an undesirable splitting of the given IO operation.

For situations in which all paths of a given path set are indicated as not serviceable, the system can be configured by default to select a different path set to service the IO operation, possibly instead of or in addition to reporting the failure to the application that generated the JO operation. Users can be permitted to override or otherwise adjust the default behavior in a given embodiment.

The particular features and functionality of the embodiments of FIGS. 4 and 5 as described above can be varied in other embodiments.

Also, as mentioned previously, different instances of the above-described algorithms and other storage cache aware processing techniques can be performed by different MPIO drivers in different host devices.

The particular storage cache aware processing arrangements described above are therefore presented by way of illustrative example only. Numerous alternative arrangements of these and other features can be used in implementing the storage cache aware processing in other illustrative embodiments.

The illustrative embodiments disclosed herein can provide a number of significant advantages relative to conventional arrangements.

For example, some embodiments configure a multi-path layer of one or more host devices to include functionality for storage cache aware processing of IO operations that provides improved load balancing and failover policy implementation.

Illustrative embodiments advantageously avoid situations in which a host-based load balancing algorithm or other type of path selection algorithm that is unaware of the particular cache entity configuration of a storage system can inadvertently cause an increased number of cache misses, thereby increasing the processing overhead of the storage system and degrading its performance. Instead, such embodiments can substantially reduce cache misses by better matching a load balancing algorithm or other type of path selection algorithm of a multi-path layer of a host device to the cache entity configuration of the storage system, leading to improved overall performance.

Accordingly, some embodiments leverage a multi-path layer of one or more host devices to provide enhanced performance in processing of IO operations directed to one or more storage arrays or other types of storage systems.

These and other arrangements are advantageously configured to provide efficient storage cache aware processing even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system.

Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated storage cache aware processing arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device being further configured to execute one or more processes that generate input-output operations for delivery to the storage system;
the host device comprising:
a multi-path input-output driver configured to control delivery of the input-output operations to the storage system over selected ones of a plurality of paths through the network;
wherein the multi-path input-output driver is further configured:
to access for each of one or more of the storage devices a stored mapping between ranges of logical block addresses of the storage device and respective ones of a plurality of cache entities of the storage system;
to maintain a plurality of path sets associated with respective ones of the cache entities of the storage system; and
for each of at least a subset of the input-output operations:
to identify a particular one of the cache entities based at least in part on a logical block address of the input-output operation and the stored mapping; and
to select a particular one of the paths for delivery of the input-output operation to the storage system based at least in part on the identified cache entity;
wherein selecting a particular one of the paths for delivery of the input-output operation to the storage system based at least in part on the identified cache entity comprises:
identifying from the plurality of path sets at least one path set associated with the identified cache entity; and
selecting the particular path from the identified path set;
wherein selecting a particular one of the paths for delivery of the input-output operation to the storage system based at least in part on the identified cache entity further comprises performing the selection in accordance with at least one of a load balancing policy and a failover policy that utilizes the identified path set to the exclusion of one or more other ones of the plurality of path sets; and wherein utilizing the identified path set to the exclusion of one or more other ones of the plurality of path sets comprises:

defining a pool of available paths to select from for delivery of the input-output operation to the storage system as paths within the identified path set associated with the identified cache entity; and exclusively selecting from the pool of available paths to deliver the input-output operation to the storage system when implementing at least one of the load balancing policy and the failover policy.

2. The apparatus of claim 1 further comprising one or more additional host devices each configured to communicate over the network with the storage system and wherein each additional host device comprises a multi-path input-output driver configured to control delivery of input-output operations from that host device to the storage system over selected ones of a plurality of paths through the network.

3. The apparatus of claim 1 wherein the storage devices comprise respective logical storage volumes of the storage system.

4. The apparatus of claim 1 wherein the cache entities of the storage system comprise respective components of the storage system that have respective local caches associated therewith.

5. The apparatus of claim 1 wherein the cache entities of the storage system comprise respective storage controllers of the storage system with each such storage controller having a different local cache associated therewith.

6. The apparatus of claim 1 wherein the mapping is generated at least in part by the multi-path input-output driver and stored in one or more data structures of a kernel-space portion of an operating system of the host device.

7. The apparatus of claim 1 wherein the mapping is generated at least in part using information obtained from the storage system and characterizing the cache entities of the storage system.

8. The apparatus of claim 7 wherein the information characterizing the cache entities of the storage system for use in generating the mapping comprises one or more of:

information identifying components of the storage system that have respective local caches associated therewith;

information about the local caches; and a chunk size associated with the local caches, the chunk size denoting a particular number of logical block addresses.

9. The apparatus of claim 7 wherein the information characterizing the cache entities of the storage system for use in generating the mapping is obtained by the host device from the storage system utilizing at least one of:

an in-band communication mechanism in which one or more commands in a designated storage protocol are sent from the host device to the storage system; and an out-of-band communication mechanism in which host management software of the host device communicates with storage system management software of the storage system over an Internet Protocol (IP) network connection.

10. The apparatus of claim 7 wherein the mapping is generated for a given one of the storage devices by:

determining a size of the storage device in terms of a total number of logical block addresses within that storage device;

separating the total number of logical block addresses of the storage device into a plurality of ranges of logical block addresses; and assigning different ones of the ranges of logical block addresses to different ones of the cache entities of the storage system;

wherein one or more of the cache entities are each assigned multiple distinct ones of the ranges of logical block addresses; and wherein resulting assignments of ranges of logical block addresses to respective ones of the cache entities comprise the mapping.

11. The apparatus of claim 10 wherein separating the total number of logical block addresses of the storage device into a plurality of ranges of logical block addresses comprises separating the total number of logical block addresses into the plurality of ranges of logical block addresses using a designated chunk size, the chunk size denoting a particular number of logical block addresses.

12. The apparatus of claim 1 wherein identifying a particular one of the cache entities based at least in part on a logical block address of the input-output operation and the stored mapping comprises:

determining an initial logical block address and a transfer length for the input-output operation;

computing a target logical block address based at least in part on the initial logical block address and the transfer length;

identifying a particular logical block address range that includes the target logical block address; and utilizing the stored mapping to identify the particular one of the cache entities corresponding to the particular logical block address range;

wherein the target logical block address is different than the initial logical block address.

13. The apparatus of claim 12 wherein the target logical block address comprises an approximate midpoint logical block address between the initial logical block address and a final logical block address as indicated by the transfer length.

14. A method comprising:

executing in a host device one or more processes that generate input-output operations for delivery to a storage system comprising a plurality of storage devices;

implementing a multi-path input-output driver in the host device, the multi-path input-output driver controlling delivery of the input-output operations from the host device to the storage system over selected ones of a plurality of paths through the network; and configuring the multi-path input-output driver to perform steps of:

accessing for each of one or more of the storage devices a stored mapping between ranges of logical block addresses of the storage device and respective ones of a plurality of cache entities of the storage system;

maintaining a plurality of path sets associated with respective ones of the cache entities of the storage system; and for each of at least a subset of the input-output operations:

identifying a particular one of the cache entities based at least in part on a logical block address of the input-output operation and the stored mapping; and selecting a particular one of the paths for delivery of the input-output operation to the storage system based at least in part on the identified cache entity;

wherein selecting a particular one of the paths for delivery of the input-output operation to the storage system based at least in part on the identified cache entity comprises:

identifying from the plurality of path sets at least one path set associated with the identified cache entity; and selecting the particular path from the identified path set;

wherein selecting a particular one of the paths for delivery of the input-output operation to the storage system based at least in part on the identified cache entity further comprises performing the selection in accordance with at least one of a load balancing policy and a failover policy that utilizes the identified path set to the exclusion of one or more other ones of the plurality of path sets; and wherein utilizing the identified path set to the exclusion of one or more other ones of the plurality of path sets comprises:

defining a pool of available paths to select from for delivery of the input-output operation to the storage system as paths within the identified path set associated with the identified cache entity; and exclusively selecting from the pool of available paths to deliver the input-output operation to the storage system when implementing at least one of the load balancing policy and the failover policy.

15. The method of claim 14 wherein identifying a particular one of the cache entities based at least in part on a logical block address of the input-output operation and the stored mapping comprises:

determining an initial logical block address and a transfer length for the input-output operation;

computing a target logical block address based at least in part on the initial logical block address and the transfer length;

identifying a particular logical block address range that includes the target logical block address; and utilizing the stored mapping to identify the particular one of the cache entities corresponding to the particular logical block address range;

wherein the target logical block address is different than the initial logical block address.

16. A computer program product comprising a non-transitory processor-readable storage medium having stored therein program code of one or more software programs, wherein the program code, when executed by a host device configured to communicate over a network with a storage system comprising a plurality of storage devices, causes the host device:

to execute one or more processes that generate input-output operations for delivery to the storage system;

to implement a multi-path input-output driver in the host device, the multi-path input-output driver controlling delivery of the input-output operations from the host device to the storage system over selected ones of a plurality of paths through the network; and to configure the multi-path input-output driver to perform steps of:

accessing for each of one or more of the storage devices a stored mapping between ranges of logical block addresses of the storage device and respective ones of a plurality of cache entities of the storage system;

maintaining a plurality of path sets associated with respective ones of the cache entities of the storage system; and for each of at least a subset of the input-output operations:

identifying a particular one of the cache entities based at least in part on a logical block address of the input-output operation and the stored mapping; and selecting a particular one of the paths for delivery of the input-output operation to the storage system based at least in part on the identified cache entity;

wherein selecting a particular one of the paths for delivery of the input-output operation to the storage system based at least in part on the identified cache entity comprises:

identifying from the plurality of path sets at least one path set associated with the identified cache entity; and selecting the particular path from the identified path set;

wherein selecting a particular one of the paths for delivery of the input-output operation to the storage system based at least in part on the identified cache entity further comprises performing the selection in accordance with at least one of a load balancing policy and a failover policy that utilizes the identified path set to the exclusion of one or more other ones of the plurality of path sets; and wherein utilizing the identified path set to the exclusion of one or more other ones of the plurality of path sets comprises:

defining a pool of available paths to select from for delivery of the input-output operation to the storage system as paths within the identified path set associated with the identified cache entity; and exclusively selecting from the pool of available paths to deliver the input-output operation to the storage system when implementing at least one of the load balancing policy and the failover policy.

17. The computer program product of claim 16 wherein identifying a particular one of the cache entities based at least in part on a logical block address of the input-output operation and the stored mapping comprises:

determining an initial logical block address and a transfer length for the input-output operation;

computing a target logical block address based at least in part on the initial logical block address and the transfer length;

identifying a particular logical block address range that includes the target logical block address; and utilizing the stored mapping to identify the particular one of the cache entities corresponding to the particular logical block address range;

wherein the target logical block address is different than the initial logical block address.

18. The computer program product of claim 17 wherein the target logical block address comprises an approximate midpoint logical block address between the initial logical block address and a final logical block address as indicated by the transfer length.

19. The computer program product of claim 16 wherein the mapping is generated at least in part using information obtained from the storage system and characterizing the cache entities of the storage system.

20. The computer program product of claim 19 wherein the information characterizing the cache entities of the storage system for use in generating the mapping comprises one or more of:

information identifying components of the storage system that have respective local caches associated therewith;
information about the local caches; and
a chunk size associated with the local caches, the chunk size denoting a particular number of logical block addresses.

* * * * *